United States Patent
Bergdahl

(10) Patent No.: US 10,421,406 B2
(45) Date of Patent: Sep. 24, 2019

(54) REMOVABLE LUGGAGE BOX FOR STORAGE IN A LUGGAGE OR TRUNK SPACE OF A MOTOR VEHICLE, AND ESPECIALLY OF A HATCHBACK OR STATION WAGON AUTOMOBILE

(71) Applicant: VOLVO CAR CORPORATION, Gothenburg (SE)

(72) Inventor: Magnus Bergdahl, Kungalv (SE)

(73) Assignee: Volvo Car Corporation, Gothenburg (SE)

( * ) Notice: Subject to any disclaimer, the term of this patent is extended or adjusted under 35 U.S.C. 154(b) by 216 days.

(21) Appl. No.: 14/878,311

(22) Filed: Oct. 8, 2015

(65) Prior Publication Data

US 2016/0107581 A1  Apr. 21, 2016

(30) Foreign Application Priority Data

Oct. 17, 2014  (EP) ...................................... 14189324

(51) Int. Cl.
  *B60R 11/00* (2006.01)
  *B60R 7/02* (2006.01)
(52) U.S. Cl.
  CPC ......... *B60R 7/02* (2013.01); *B60R 2011/0036* (2013.01); *B60R 2011/0084* (2013.01)
(58) Field of Classification Search
  CPC ............... B60R 7/02; B60R 2011/0036; B60R 2011/0084
  USPC ....... 224/281, 496, 548, 554, 553, 495, 282, 224/280, 403–404, 539, 542; 414/462; 296/37.6, 26.09; 410/104
  See application file for complete search history.

(56) References Cited

U.S. PATENT DOCUMENTS

| | | | | |
|---|---|---|---|---|
| 5,669,537 | A  * | 9/1997 | Saleem | B60R 5/045 224/42.32 |
| 6,546,598 | B1 * | 4/2003 | Nakanou | B60R 5/04 108/44 |
| 6,626,481 | B2 | 9/2003 | Kawasaki | |
| 6,733,060 | B1 * | 5/2004 | Pavkov | B60R 5/04 108/110 |
| 7,401,716 | B2 * | 7/2008 | Svenson | B60R 5/045 224/42.32 |

(Continued)

FOREIGN PATENT DOCUMENTS

CN  1966311 A  5/2007
DE  19721877 A1  12/1997
(Continued)

OTHER PUBLICATIONS

Machine Translation of DE 102010000800 A1, generated using WIPO Patent Scope.*
(Continued)

*Primary Examiner* — Derek J Battisti
(74) *Attorney, Agent, or Firm* — Brooks Kushman P.C.

(57) ABSTRACT

A luggage box for storage in a luggage space of a motor vehicle comprises a container open at a top and adapted to be held slideably by a respective pair of guide elements between a pair of parallel guide rails secured one each to a respective side wall of the luggage space. The container is coupled to a lid via a hinge portion. The lid has a size and shape complementary to the open top of the container, which size and shape corresponds to an area behind one or more backrests of a row of vehicle seats between second guide rail sections, which extend along the backrests towards a floor of the luggage space. The luggage box is translatable in the guide rails, to a position adjacent the backrests of the vehicle seats.

15 Claims, 7 Drawing Sheets

(56) References Cited

U.S. PATENT DOCUMENTS

| | | | |
|---|---|---|---|
| 7,481,477 B2 | 1/2009 | Yang | |
| 7,762,602 B2 * | 7/2010 | Bohlke | B60R 5/045 296/37.16 |
| 7,934,761 B2 * | 5/2011 | Buehl | B60R 5/045 296/37.1 |
| 8,281,967 B2 * | 10/2012 | Evans | B60R 9/00 224/404 |
| 2006/0061117 A1 | 3/2006 | Lester et al. | |
| 2006/0226189 A1 * | 10/2006 | Lussier | B60P 3/14 224/404 |
| 2011/0101736 A1 | 5/2011 | Sogame | |

FOREIGN PATENT DOCUMENTS

| | | | | |
|---|---|---|---|---|
| DE | 102004041763 A1 * | 3/2006 | | B60P 1/003 |
| DE | 202007016318 U1 | 2/2008 | | |
| DE | 102010000800 A1 * | 7/2011 | | B60N 2/3011 |
| DE | 102012004821 A1 | 9/2013 | | |
| EP | 2062782 A1 | 5/2009 | | |
| JP | H07257288 A | 10/1995 | | |
| WO | 9726175 A1 | 7/1997 | | |

OTHER PUBLICATIONS

Extended European Search Report dated Apr. 16, 2015, Application No. 14189324.8-1503, Applicant Volvo Car Corporation, 5 Pages.

European Patent Office, Communication pursuant to Article 94(3) EPC for European Application No. 14189324.8-1503, dated Dec. 14, 2017.

China National Intellectual Property Administration, Office Action for Counterpart application No. CN201510648322.1, dated Dec. 13, 2018, including English translation of claims, 10 pages total.

* cited by examiner

REMOVABLE LUGGAGE BOX FOR STORAGE IN A LUGGAGE OR TRUNK SPACE OF A MOTOR VEHICLE, AND ESPECIALLY OF A HATCHBACK OR STATION WAGON AUTOMOBILE

CROSS-REFERENCE TO RELATED APPLICATIONS

This application claims foreign priority benefits under 35 U.S.C. § 119(a)-(d) to European patent application number EP 14189324.8, filed Oct. 17, 2014, which is incorporated by reference in its entirety.

TECHNICAL FIELD

Embodiments herein relate to a removable luggage box for storage in a confined space open at the top, and delimited by a floor, a pair of side walls, a hatch and one or more backrests of a row of vehicle seats, particularly a luggage or trunk space of a motor vehicle, and especially of a hatchback or station wagon automobile, as well as a vehicle that comprises such a removable luggage box.

BACKGROUND

Motor vehicles, such as hatchbacks and station wagon automobiles, small vans and the like frequently have loading or storage spaces, e.g., luggage or trunk spaces, behind the rear seats of the vehicles. Several attempts have been made to improve the storage functionality of such luggage or trunk spaces.

One such example is provided by document U.S. Pat. No. 6,546,598, which relates to a vehicle luggage compartment structure, facilitating the putting in and taking out of small articles from a tray provided in a luggage compartment, and enabling the luggage compartment to be partitioned by the tray by fixing a box to a floor surface of the luggage compartment.

A first protruding portion and a second protruding portion for engagement of the tray of U.S. Pat. No. 6,546,598 are engaged with a first guide groove and a first anchor hole of the box, respectively, to hold the tray in the box. By sliding the first protruding portion for engagement along the first guide groove to pull the tray out to the rear of the vehicle, a top wall of the luggage compartment no longer covers an open top side of the tray, thereby enabling small articles to be easily placed into and taken out from the tray. Moreover, by swinging the first protruding portion for engagement downward along a second guide groove to fix the tray substantially vertically, the luggage compartment can be partitioned by the tray, so that damage to the articles due to moving and the like in the luggage compartment can be prevented.

In addition to the effects produced by the functions as a tray and a partition, there is an effect described in U.S. Pat. No. 6,546,598 which enables more of the luggage compartment to be used since the tray can be easily and completely removed from the luggage compartment.

However, there is still room for improvement in the above field.

SUMMARY

Embodiments herein aim to provide an improved luggage box for storage in a confined space, particularly a luggage or trunk space of a motor vehicle, and especially of a hatchback or station wagon automobile.

This is provided through a luggage box for storage in a confined space open at the top, and delimited by a floor, a pair of side walls, a hatch and one or more backrests of a row of vehicle seats, particularly a luggage or trunk space of a motor vehicle, and especially of a hatchback or station wagon automobile, where a pair of parallel guide rails are secured one to each side wall of the confined space, a first section of which guide rails extends from the hatch over the confined space at the top and a second section of which guide rails continues further along the backrests towards the floor of the confined space and where each guide rail has a respective opening adjacent the respective ends of the guide rails at the hatch; where the luggage box comprises, a container open at the top and adapted to be held extending between the guide rails through having a respective pair of guide elements at its ends slidably receivable in the guide rails, a lid having a size and shape complementary to the open top of the container; where the container and the lid are coupled to each other via a hinge portion extending transversely between the guide rails, and where the size of the lid corresponds to an area behind the backrests between the second guide rail sections, and where the luggage box, when held by the guide rails with its lid closed is translatable in the guide rails, such that the luggage box becomes placed with its lid extending between the second guide rail sections adjacent the backrests of the vehicle seats.

The provision of a luggage box, as above, provides for an efficient use a luggage or trunk space of a motor vehicle. The possibility to store the luggage box adjacent the backrests of the vehicle seats frees up space for additional storage possibilities near a trunk or tail gate opening of the vehicle.

According to a second aspect is provided that each guide element of the pairs of guide elements has a size and geometry allowing it to pass through either of the respective openings of the guide rails adjacent the respective ends of the guide rails at the hatch, such that the luggage box is removable from the guide rails through translating the luggage box in the guide rails and extracting the pairs of guide elements through the respective openings of the guide rails adjacent the respective ends of the guide rails at the hatch.

The provision of guide elements having a size and geometry making the luggage box is removable from the guide rails, and thus from the vehicle, provide for easy loading and emptying of the luggage box outside of the vehicle.

According to a third aspect is provided that the container is impermeable to water.

The provision of a container which is impermeable to water provides for a luggage box which is able to handle wet and dirty gear without unnecessarily soiling the luggage or trunk space of an associated motor vehicle.

According to a fourth aspect is provided that the container has one or more handles arranged at a first side of the container intended to face towards the hatch when the container is held between the guide rails.

The provision of handles at a first side of the container intended to face towards the hatch enables a simplified handling of translation of the luggage box along the guide rails as well as removal of the luggage box from the guide rails.

According to a fifth aspect is provided that the container has one or more handles arranged at a second side of the container intended to face towards the backrests when the container is held between the guide rails.

The provision of handles at a second side of the container intended to face towards the backrests enables a simplified handling of translation of the luggage box along the guide rails as well as removal of the luggage box from the guide rails, should the luggage box be mounted to the guide rails with its first side facing towards the backrests and its second side facing towards the hatch.

According to a sixth aspect is provided that the container has one or more pairs of handles a respective handle of which pairs are arranged at the first and second sides of the container intended to face towards the hatch and the backrests when the container is held between the guide rails.

The provision of pairs of handles a respective handle of which pairs are arranged at the first and second sides of the container enables a simplified handling of translation of the luggage box along the guide rails as well as removal of the luggage box from the guide rails, irrespective of which way it is mounted to the guide rails.

According to a seventh aspect is provided that the container has one or more pairs of handles a respective handle of which pairs are arranged at third and fourth sides of the container intended to face towards the respective side walls when the container is held between the guide rails.

The provision of pairs of handles a respective handle of which pairs are arranged at third and fourth sides of the container provides for easy handling and carrying if removed from the guide rails of a vehicle.

According to an eight aspect is provided that the second side of the container intended to face towards the backrests when the container is held between the guide rails is slanted towards the bottom of the container such that an angle between the lid and this slanted second side of the container corresponds to an angle between the second sections of the guide rails and the floor of the confined space.

The provision of the second side of the container being slanted towards the bottom of the container such that an angle between the lid and this slanted second side corresponds to an angle between the second sections of the guide rails and the floor of the confined space provides for optimum use of available trunk space while enabling the luggage box to rest fully supported by the floor whilst being secured by the rails to stay close to the backrests of the adjacent vehicle seats.

According to a ninth aspect is provided that the first side of the container intended to face towards the hatch when the container is held between the guide rails is slanted towards the bottom of the container such that an angle between the lid and this slanted first side of the container corresponds to an angle between the second sections of the guide rails and the floor of the confined space.

The provision of the first side of the container being slanted towards the bottom of the container such that an angle between the lid and this slanted first side of the container corresponds to an angle between the second sections of the guide rails and the floor of the confined space provides for optimum use of available trunk space while enabling the luggage box to rest fully supported by the floor whilst being secured by the rails to stay close to the backrests of the adjacent vehicle seats, should the luggage box be mounted to the guide rails with its first side facing towards the backrests and its second side facing towards the hatch.

According to a tenth aspect is provided that the bottom of the container is provided with a rigidifying structure.

The provision of a rigidifying structure, as above, enables a luggage box capable of sustaining a substantial load therein without sagging.

According to an eleventh aspect is provided that the rigidifying structure comprises a plurality of reinforcing ribs extending between the first and second sides of the container intended to face towards the hatch and the backrests when the container is held between the guide rails.

The provision of a plurality of reinforcing ribs, as above, provides a simple and efficient rigidifying structure.

According to a final aspect is provided a motor vehicle which comprises a luggage box as above.

A vehicle which comprises a luggage box as above is able to carry loads, as the luggage box can be stowed or removed and readily replaced following removal thereof. The luggage box further provides to the vehicle flexibility in trunk space configurations.

BRIEF DESCRIPTION OF THE DRAWINGS

In the following, embodiments according to the present disclosure will be described in greater detail by way of example only with reference to the attached drawings, in which.

Still other objects and features of embodiments herein will become apparent from the following detailed description considered in conjunction with the accompanying drawings. It is to be understood, however, that the drawings are designed solely for purposes of illustration and not as a definition of the limits hereof, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION

As required, detailed embodiments are disclosed herein; however, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
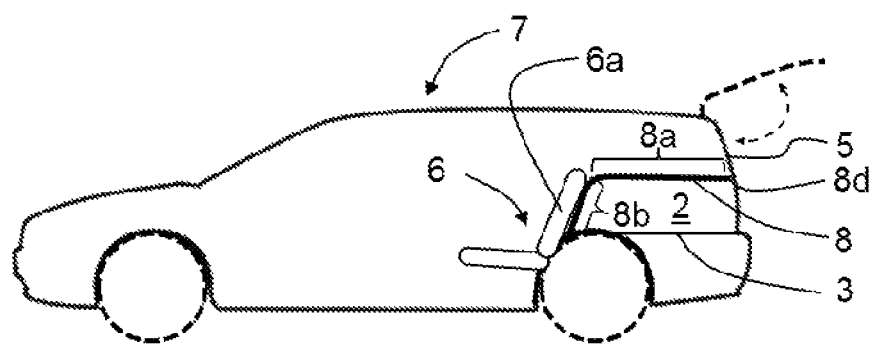
FIG. 1 is a schematic illustration of a motor vehicle which comprises guide rails for receipt of a luggage box according to embodiments herein.

In overview embodiments herein relate to a luggage box 1 for storage in a confined space 2, as illustrated in FIG. 1, open at the top, and delimited by a floor 3, a pair of side walls 4, a hatch 5 or door/tail-gate and one or more backrests 6a of a row of vehicle seats 6, particularly a luggage or trunk space of a motor vehicle 7, and especially of a hatchback or station wagon automobile.

Thus, as illustrated in FIG. 1, the confined space 2 comprises a pair of parallel guide rails 8. These guide rails 8 are secured one to each side wall 4 of the confined space 2. A first section 8a of the respective guide rails 8 extends from the hatch 5, or if the hatch 5 is opened (as illustrated in dashed lines in FIG. 1) from the hatch opening, over the confined space 2 at the top thereof. A second section 8b of the respective guide rails 8 continues, without interruption of a guide path of the respective guide rail 8, further along the backrests 6a of the vehicle seats 6 towards the floor 3 of the confined space 2. Each guide rail 8 has a respective opening 8c adjacent the respective ends 8d of the guide rails 8 at the hatch 5.

Figure 2:
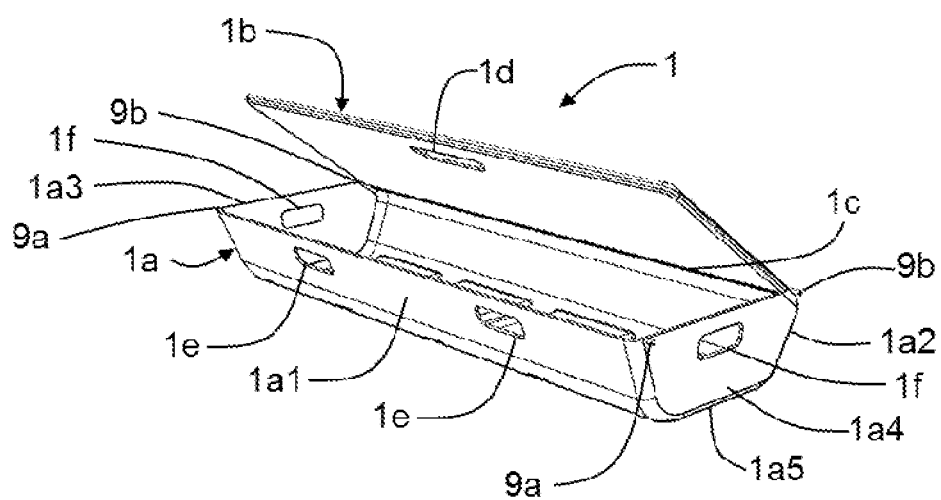
FIG. 2 is a schematic illustration of a luggage box according to embodiments herein.

The luggage box 1, as illustrated in FIG. 2, includes a container 1a, which is open at the top and adapted to be held extending between the guide rails 8 through having a respective pair of guide elements 9a, 9b at its ends facing the guide rails 8, which guide elements 9a, 9b are slidably receivable in the guide rails 8.

Figure 3:
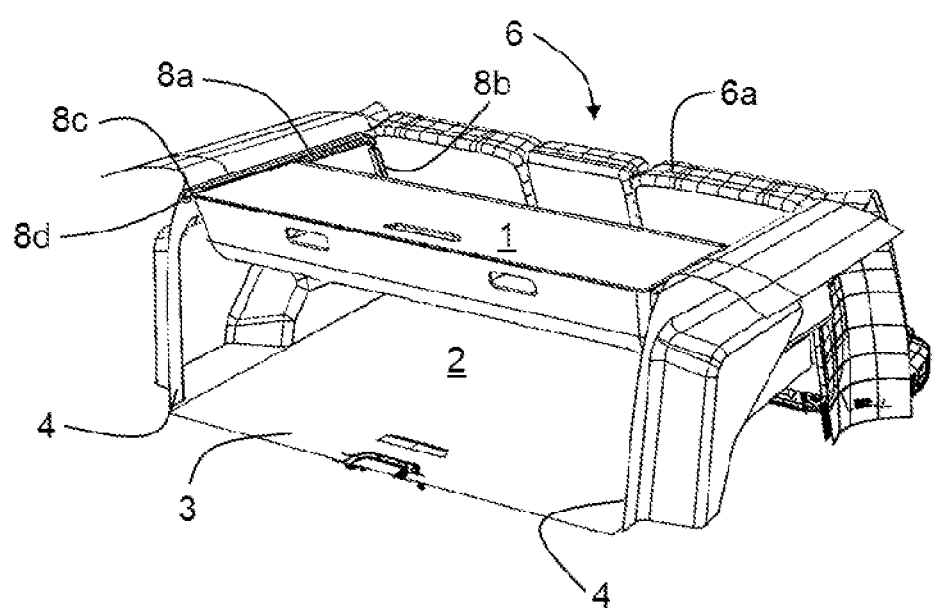
FIG. 3 is a schematic illustration of a luggage box according to embodiments herein in a position adjacent a hatch opening.
Figure 4:
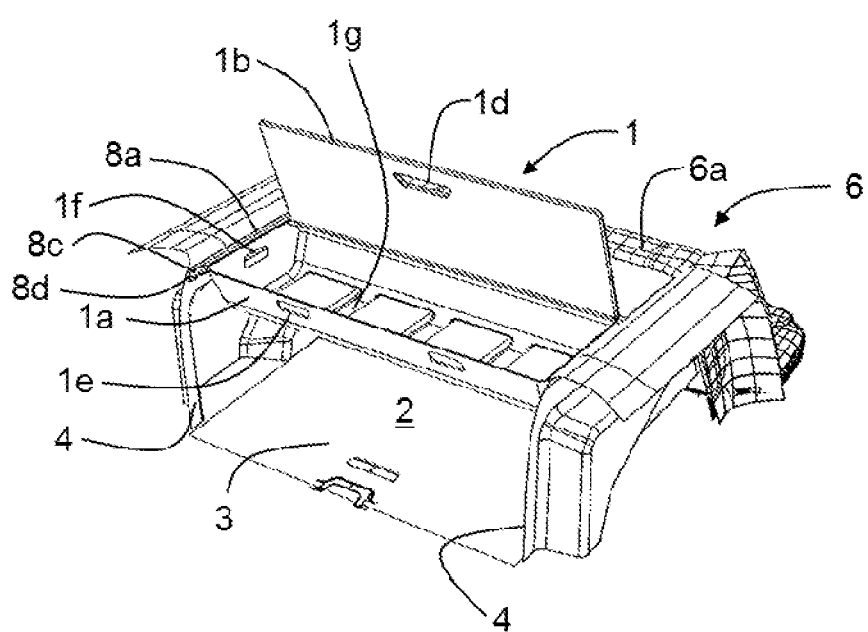
FIG. 4 is a schematic illustration of a luggage box according to embodiments herein in a position according to FIG. 3 with an open lid.

The luggage box 1 is constituted by two parts, the container 1a and a lid 1b, having a size and shape complementary to the open top of the container 1a. The lid 1b is coupled to the container 1a via a hinge portion 1c, that extends transversely between the guide rails 8 when the luggage box 1 is held by the guide rails 8 at the top of the confined space 2, as illustrated in FIGS. 3 and 4. The lid 1b preferably comprises one or more handles 1d, for facilitating opening thereof. The lid 1b also serves to safeguard overloading of the luggage box 1.

The luggage box 1 has a pair of first guide elements 9a at respective corners thereof remote from the hinge portion 1c and a pair of second guide elements 9b at respective corners thereof adjacent the hinge portion 1c. The lid 1b has no guide elements and is thus freely openable when the luggage box 1 is held by the guide rails 8 at the top of the confined space 2, as illustrated in FIGS. 3 and 4.

A combined top area of the container 1a with the lid 1b in a closed position, as illustrated in FIG. 3, is equal to or less than the area of the open top of the confined space 2 between the guide rails 8. The size of the lid 1b corresponds to, or is slightly less than, an area behind the backrests 6a of the vehicle seats 6 between the second guide rail sections 8b.

Further, as illustrated in FIG. 4, the provision of the hinge portion 1c, by which the container 1a and lid 1b are coupled to each other, enables opening of the luggage box 1 through folding the lid 1b upwardly when the luggage box 1 is held by the guide rails 8 at the top of the confined space 2. This provides easy access to the container 1a of the luggage box 1 via the hatch 5, door or tail-gate, for storing items to, or retrieving items from, the luggage box 1.

Figure 5:
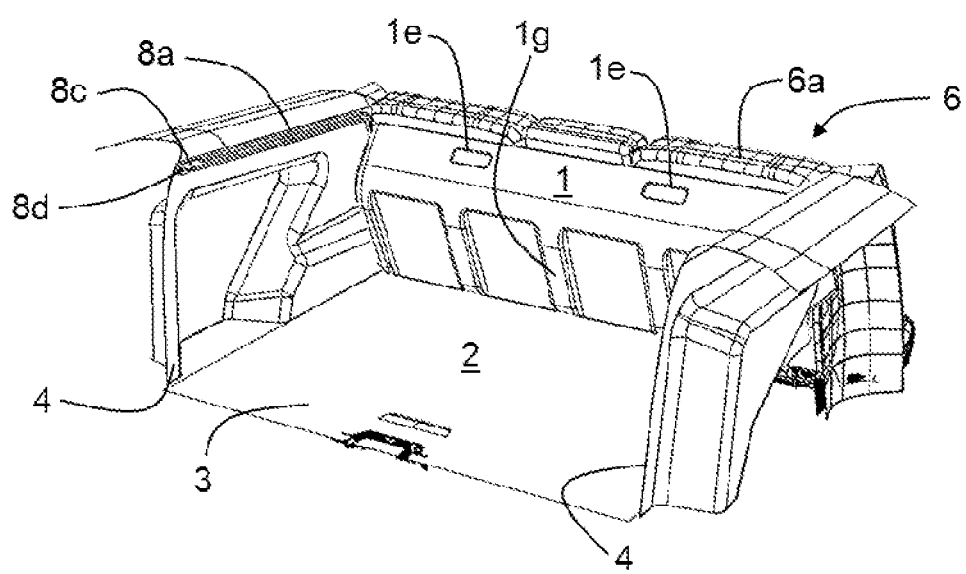
FIG. 5 is a schematic illustration of a luggage box according to embodiments herein in a position where the luggage box is stowed behind the backrests of a row of vehicle seats.

The luggage box 1, when held by the guide rails 8 with its lid 1b closed, as illustrated in FIG. 3, is translatable in the guide rails 8. Having the outwardly facing surface area of the lid 1a correspond to, or being slightly less than, the area behind the backrests 6a of the vehicle seats 6 between the second guide rail sections 8b enables storage of the luggage box 1, as illustrated in FIG. 5, such that the luggage box 1 becomes placed with its lid 1b extending between the second guide rail sections 8b adjacent the backrests 6a of the vehicle seats 6. Hereby the confined space 2 will be essentially freely accessible from the top thereof. When placed as illustrated in FIG. 5, the lid 1b also serves the purpose to protect the back of the backrests 6a of the vehicle seats 6.

Each guide element 9a, 9b of the pairs of guide elements 9a, 9b has a size and geometry allowing it to pass through either of the respective openings 8c of the guide rails 8 adjacent the respective ends 8d of the guide rails 8 at the hatch 5.

Figure 6:
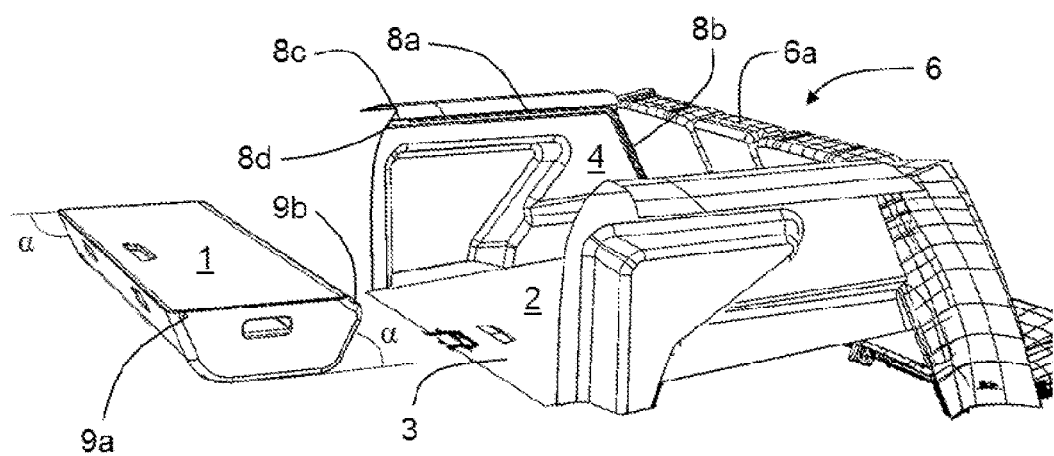
FIG. 6 is an enlarged partial view schematic side view of a luggage box according to embodiments herein in a position where the luggage box is removed from the vehicle.

Hereby the luggage box 1, as illustrated in FIG. 6, is removable from the guide rails 8 through translating the luggage box 1 in the guide rails 8 and extracting the pairs of guide elements 9a, 9b through the respective openings 8c of the guide rails 8 adjacent the respective ends 8d of the guide rails 8 at the hatch 5. Conversely, the luggage box 1 is also mountable to the guide rails 8 through inserting the pairs of guide elements 9a, 9b through the respective openings 8c of the guide rails 8 adjacent the respective ends 8d of the guide rails 8 at the hatch 5 and translating the luggage box 1 into the guide rails 8.

In order to be able to handle wet and dirty gear without unnecessarily soiling the confined space 2, i.e., the luggage or trunk space of an associated motor vehicle, the container 1a of the luggage box 1 is, in some embodiments, impermeable to water.

In some embodiments, as illustrated in FIG. 2, the container has one or more handles 1e arranged at a first side 1a1 of the container 1a intended to face towards the hatch 5 when the container 1a is held between the guide rails 8 as illustrated in FIG. 3. Such handles 1e, provided at a first side 1a1 of the container 1a intended to face towards the hatch 5, enables a simplified handling of translation of the luggage box 1 along the guide rails 8 as well as removal of the luggage box 1 from the guide rails 8.

In yet some embodiments the container has one or more handles 1e arranged at a second side 1a2 of the container 1a, intended to face towards the backrests 6a when the container 1a is held between the guide rails 8 as illustrated in FIG. 3. Such handles, provided at a second side 1a2 of the container 1a intended to face towards the backrests 6a, enables a simplified handling of translation of the luggage box 1 along the guide rails 8 as well as removal of the luggage box 1 from the guide rails 8. This is, in particular, useful should the luggage box 1 be mounted to the guide rails 8 with its first side 1a1 facing towards the backrests 6a and its second side 1a2 facing towards the hatch 5.

In still further embodiments the container 1a has one or more pairs of handles 1e, a respective handle 1e of which pairs of handles 1e are arranged at the first 1a1 and second 1a2 sides of the container 1a intended to face towards the hatch 5 and the backrests 6a when the container 1a is held between the guide rails 8 as illustrated in FIG. 3. Such handles 1e, where a respective handle 1e of each pairs of handles 1e are arranged at the first 1a1 and second 1a2 sides of the container 1a, enables a simplified handling of translation of the luggage box 1 along the guide rails 8 as well as removal of the luggage box 1 from the guide rails 8, irrespective of which way the luggage box 1 is mounted to the guide rails 8.

Mounting of the luggage box 1 to the guide rails 8 with its first side 1a1 facing towards the backrests 6 and its second side 1a2 facing towards the hatch 5 provides for improved accessibility from the vehicle seats 6 adjacent the confined space 2, i.e., adjacent the luggage or trunk space of the motor vehicle 7, for storing items in or retrieving items from the luggage box 1.

In embodiments the container 1a preferably has one or more pairs of handles 1f, a respective handle 1f of which pairs of handles 1f are arranged at third 1a3 and fourth 1a4 sides of the container 1a intended to face towards the respective side walls 4 when the container 1a is held between the guide rails 8 as illustrated in FIG. 3. Such handles 1f, a respective handle 1f of which pairs of handles 1f are arranged at third 1a3 and fourth 1a4 sides of the container 1a, provides for easy handling and carrying if the luggage box 1 is removed from the guide rails 8 of a vehicle 7 and subsequently from the vehicle 7.

Figure 7:
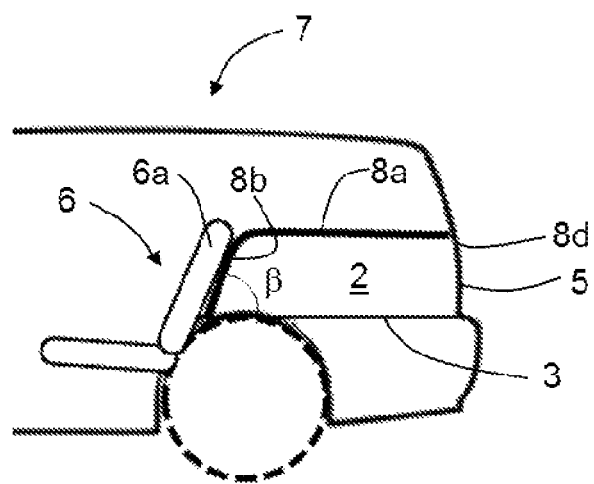
FIG. 7 is an enlarged partial view of the vehicle having guide rails for receipt of a luggage box according to FIG. 1.

FIG. 7 shows an enlarged partial view of the vehicle having guide rails for receipt of a luggage box according to FIG. 1 and illustrates an angle $\beta$, between the second sections 8b of the guide rails 8 and the floor 3 of the confined space 2.

The second side 1a2 of the container 1a, intended to face towards the backrests 6a when the container 1a is held between the guide rails 8, as illustrated in FIG. 3, is slanted towards a bottom 1a5 of the container 1a such that an angle $\alpha$ between the lid 1b and this slanted second side 1a2 of the container 1a corresponds to the angle $\beta$, see FIGS. 6 and 7, between the second sections 8b of the guide rails 8 and the floor 3 of the confined space 2. Through the second side 1a2 of the container 1a being slanted towards the bottom 1a5 of the container 1a, such that the angle $\alpha$ between the lid 1b and this slanted second side 1a2 corresponds to the angle $\beta$, see FIGS. 6 and 7, between the second sections 8b of the guide rails 8 and the floor 3 of the confined space 2, provides for optimum use of available trunk space while enabling the luggage box 1 to rest fully supported by the floor 3 whilst being secured by the guide rails 8 to stay close to the backrests 6a of the adjacent vehicle seats 6, as illustrated in FIG. 5.

The bottom 1a5 of the container 1a will, as e.g., seen in FIG. 2, be essentially parallel to the plane of the lid 1b when closed, as illustrated in FIG. 3. Thus the angle between the bottom 1a5 of the container 1a and the slanted second side 1a2 will also be an angle $\alpha$, which corresponds to the angle $\beta$, see FIGS. 6 and 7, between the second sections 8b of the guide rails 8 and the floor 3 of the confined space 2.

It is especially advantageous if the first side 1a1 of the container 1a, intended to face towards the hatch 5 when the container is held between the guide rails 8 as illustrated in FIG. 3, is also slanted towards the bottom 1a5 of the container 1a, such that an angle $\alpha$ between the lid 1b and this slanted first side 1a1 of the container 1a corresponds to the angle $\beta$, see FIGS. 6 and 7, between the second sections 8b of the guide rails 8 and the floor 3 of the confined space 2. Having the first side 1a1 of the container 1a being slanted towards the bottom 1a5 of the container 1a, symmetrical to the second side 1a2, such that the angle $\alpha$ between the lid 1b and this slanted first side 1a1 of the container 1a corresponds to the angle $\beta$, see FIGS. 6 and 7, between the second sections 8b of the guide rails 8 and the floor 3 of the confined space 2, provides for optimum use of available trunk space while enabling the luggage box 1 to rest fully supported by the floor 3 whilst being secured by the guide rails 8 to stay close to the backrests 6a of the adjacent vehicle seats 6, should the luggage box 1 be mounted to the guide rails 8 with its first side 1a1 facing towards the backrests 6a and its second side 1a2 facing towards the hatch 5.

This is especially useful should the luggage box 1 be mounted to the guide rails 8 with its first side 1a1 facing towards the backrests 6a and its second side 1a2 facing towards the hatch 5 in order to provide for improved accessibility from the vehicle seats 6 adjacent the confined space 2, i.e., adjacent the luggage or trunk space of the motor vehicle 7, as described above.

In order to make the luggage box 1 capable of sustaining substantial loads therein without sagging, in some embodiments, the bottom 1a5 of the container 1a of the luggage box 1 is provided with a rigidifying structure 1g. A simple and efficient rigidifying structure 1g may in some embodiments be provided by a rigidifying structure 1g that comprises a plurality of reinforcing ribs 1g extending between the first 1a1 and second 1a2 sides of the container 1a intended to face towards the hatch 5 and the backrests 6a when the container 1a is held between the guide rails 8 as illustrated in FIG. 3.

As illustrated in FIG. 2, the container 1a and lid 1b are envisaged as being substantially rectangular in shape, thus having four corners each. However, it is also envisaged that the container 1a and lid 1b could assume other shapes, although the placement of the guide elements 9a, 9b would preferably be in correspondence with that of the preferred placement at rectangular containers 1a and lids 1b, as described above. Having pairs of guide elements 9a, 9b arranged as described above facilitates controlled translation of the luggage box 1 along paths of the guide rails 8, when held by the guide rails 8.

According to some alternative embodiments herein the container 1a the hinge portion 1c and the lid 1b are integrally formed.

A luggage box 1 where the container 1a the hinge portion 1c and the lid 1b are integrally formed provides for a luggage box 1 having good structural integrity, which further may be produced economically and which does not require any assembly.

A luggage box 1, as described in the foregoing, serves as a separate luggage volume for stuff that always tend to stay in vehicle 7 luggage rooms, such as blankets, cushions, reflex west, gloves, toys, etc.

The luggage box 1 can also serve as an organizer for different activity kits, that easily can be moved from the motor vehicle 7 to a site of an activity or back to a residence of the motor vehicle 7 user. Examples of activities involving such gear suited to be stored and transported in a luggage box 1 as described herein include: climbing, sailing, diving, hunting, ice-skating and fishing, etc.

In accordance with the present disclosure is also envisaged a motor vehicle 7 having a confined space 2 open at the top, and delimited by a floor 3, a pair of side walls 4, a hatch 5 and one or more backrests 6a of a row of vehicle seats 6, particularly a luggage or trunk space, where a pair of parallel guide rails 8 are secured one to each side wall 4 of the confined space 2, a first section 8a of which guide rails 8 extends from the hatch 5 over the confined space 2 at the top and a second section 8b of which guide rails 8 continues further along the backrests 6 towards the floor 3 of the confined space 2 and where each guide rail 8 has a respective first opening 8c, facing out of the confined space 2 adjacent the respective ends 8d of the guide rails 8 at the hatch 5, comprising a luggage box 1 as described in the foregoing.

A vehicle 7 which comprises a luggage box 1, as above, is able to carry large or bulky loads, as the luggage box 1 can be stowed fully supported by a load floor 3 and removed and readily replaced following removal thereof. The luggage box 1 further provides to the vehicle 7 flexibility in handling of luggage as storage of the luggage box 1, close to the backrests 6a of the row of vehicle seats 6, frees up trunk space for additional storage possibilities near the hatch 4, door or tail gate opening.

The above-described embodiments may be varied within the scope of the following claims.

Thus, while there have been shown and described and pointed out fundamental novel features of the embodiments herein, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are equivalent. Moreover, it should be recognized that structures and/or elements and/or method steps shown and/or described in connection with any disclosed form or embodiment herein may be incorporated in any other disclosed or described or suggested form or embodiment as a general matter of design choice.

What is claimed is:

1. A luggage box for storage in a confined space open at a top, and delimited by a floor, a hatch, one or more backrests of a row of vehicle seats, and a pair of side walls having a pair of parallel guide rails secured one to each side wall, wherein a first section of each guide rail extends from the hatch over the confined space at the top to one of the one or more backrests and a second section of each guide rail continues further therefrom along the one of the one or more backrests to the floor, and wherein each guide rail has a respective opening adjacent a respective end of the guide rail at the hatch, the luggage box comprising:
   a container having an open top and being adapted to be held between the guide rails by a respective pair of guide elements at its ends slidably receivable in the guide rails; and
   a lid having a size and shape complementary to the open top of the container;
   wherein the container and the lid are coupled to each other via a hinge portion configured to extend transversely between the guide rails with the luggage box held by the guide rails at the top of the confined space; and
   wherein the size of the lid corresponds to or is less than an area behind the one or more backrests between the second guide rail sections; and
   wherein the luggage box, held by the guide rails with its lid closed, is translatable in the guide rails and, with the luggage box placed with its lid extending between the second guide rail sections adjacent the one or more backrests with the one or more backrests in an upright position, the luggage box is only orientable wherein the one or more backrests fully covers the lid.

2. The luggage box according to claim 1 wherein each guide element of the pairs of guide elements has a size and geometry allowing it to pass through either of the respective openings of the guide rails adjacent the respective ends of the guide rails at the hatch wherein the luggage box is removable from the guide rails through translating the luggage box in the guide rails and extracting the pairs of guide elements through the respective openings of the guide rails adjacent the respective ends of the guide rails at the hatch.

3. The luggage box according to claim 1 wherein the container is impermeable to water.

4. The luggage box according to claim 1 wherein the container has one or more handles arranged at a first side of the container intended to face toward the hatch when the container is held between the guide rails.

5. The luggage box according to claim 4 wherein the container has one or more handles arranged at a second side of the container intended to face toward the one or more backrests when the container is held between the guide rails.

6. The luggage box according to claim 1 wherein the container has a pair of handles arranged at a first side of the container intended to face toward the hatch when the container is held between the guide rails, and a pair of handles arranged at a second side of the container intended to face toward the one or more backrests when the container is held between the guide rails.

7. The luggage box according to claim 6 wherein the container has one or more handles arranged at each of third and fourth sides of the container, wherein each of the third and fourth sides is intended to face toward a respective side wall when the container is held between the guide rails.

8. The luggage box according to claim 1 wherein the container has one or more handles arranged at each side of the container that is intended to face toward a respective side wall when the container is held between the guide rails.

9. The luggage box according to claim 1 wherein the container has first and second sides intended to face toward the hatch and the one or more backrests, respectively, when the container is held between the guide rails, wherein the second side of the container is slanted toward a bottom of the container such that an angle between the lid and the slanted second side of the container corresponds to an angle between each of the second sections of the guide rails and the floor.

10. The luggage box according to claim 9 wherein the first side of the container intended to face toward the hatch when the container is held between the guide rails is slanted toward the bottom of the container such that an angle between the lid and the slanted first side of the container corresponds to the angle between each of the second sections of the guide rails and the floor.

11. The luggage box according to claim 1 wherein the container has a bottom that is provided with a rigidifying structure.

12. The luggage box according to claim 11 wherein the rigidifying structure comprises a plurality of reinforcing ribs extending between first and second sides of the container intended to face toward the hatch and the one or more backrests, respectively, when the container is held between the guide rails.

13. A motor vehicle comprising:
   a floor, a pair of side walls, a hatch, and a row of vehicle seats having one or more backrests that cooperate to delimit a confined space having an open top;
   a pair of parallel guide rails secured one to each side wall, a first section of each guide rail extending from the hatch over the confined space at the top to one of the one or more backrests, and a second section of each guide rail continuing therefrom along the one of the one or more backrests to the floor, wherein each guide rail has a respective first opening facing out of the confined space adjacent a respective end of the guide rail at the hatch; and
   a luggage box according to claim 1.

14. The vehicle of claim 13 wherein the confined space is a trunk space of the vehicle.

15. The vehicle of claim 13 wherein the vehicle is a hatchback or station wagon automobile.

* * * * *